(No Model.)

J. P. LAVIGNE.
PEDAL FOR BICYCLES.

No. 564,431. Patented July 21, 1896.

Witnesses.
J. H. Shumway
Lillian D. Kelsey

Joseph P. Lavigne
Inventor
By Atty. Earle Seymour

THE NORRIS PETERS CO., PHOTO-LITHO., WASHINGTON, D. C.

UNITED STATES PATENT OFFICE.

JOSEPH P. LAVIGNE, OF NEW HAVEN, CONNECTICUT, ASSIGNOR OF ONE-HALF TO WILBUR F. DAY, OF SAME PLACE.

PEDAL FOR BICYCLES.

SPECIFICATION forming part of Letters Patent No. 564,431, dated July 21, 1896.

Application filed January 11, 1896. Serial No. 575,175. (No model.)

*To all whom it may concern:*

Be it known that I, JOSEPH P. LAVIGNE, of New Haven, in the county of New Haven and State of Connecticut, have invented a new Improvement in Pedals for Bicycles; and I do hereby declare the following, when taken in connection with the accompanying drawings and the letters of reference marked thereon, to be a full, clear, and exact description of the same, and which said drawings constitute part of this specification, and represent, in—

Figure 1:
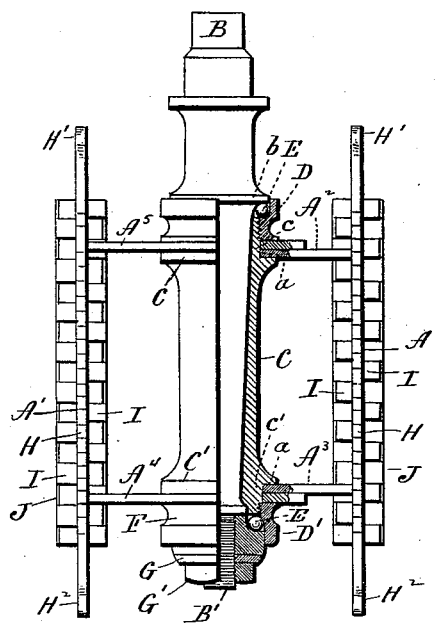
Figure 3:
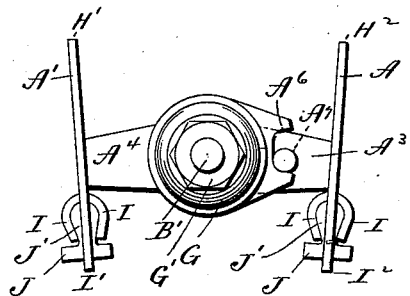
Figure 2:
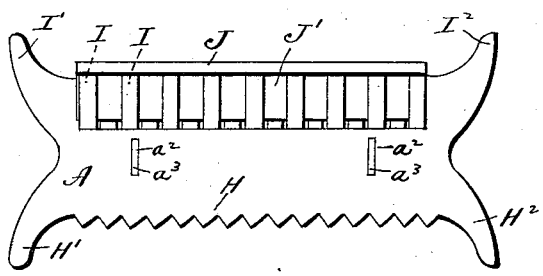
Figure 4:
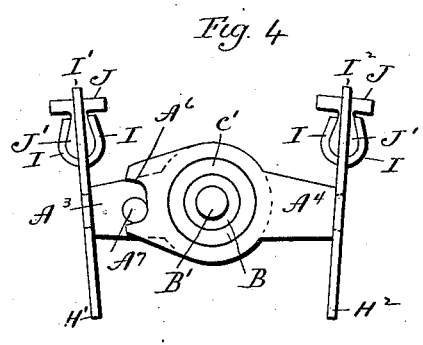
Figure 6:
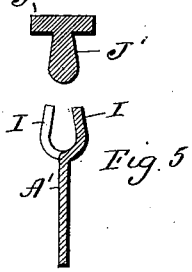
Figure 7:
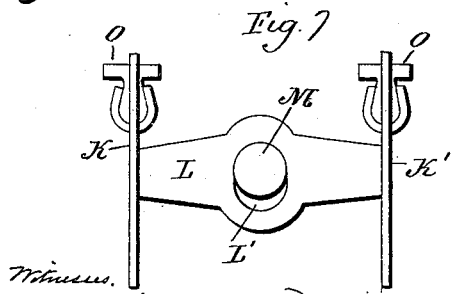

Figure 1, a view, partly in plan and partly in horizontal section, of one form which a pedal constructed in accordance with my invention may assume; Fig. 2, a view thereof in side elevation; Fig. 3, a view in end elevation, showing the pedal adjusted for use as a rat-trap pedal; Fig. 4, a corresponding view showing the pedal adjusted for use as a rubber-bar pedal; Fig. 5, a detail view showing one of the frame-plates in transverse section; Fig. 6, a corresponding view of one of the rubber bars; Fig. 7, a view in end elevation of one of the modified forms which the pedal may assume.

My invention relates to an improved pedal for bicycles, the object being to produce a combination-pedal having footholds or working faces of two types, and adapted to be convertibly balanced, so as to present uppermost to the foot either one foothold or face or the other, according to the disposition of the rider or the dictation of circumstances, so that one pedal is made to combine the advantages of two distinct types of pedals with obvious gain in economy and convenience.

With these ends in view my invention consists in a combination-pedal having its frame movable with respect to its spindle for shifting the center of gravity of the frame, so as to cause it to balance with either one of its footholds uppermost.

My invention further consists in a pedal having certain details of construction and combinations of parts, as will be hereinafter described, and pointed out in the claims.

For the illustration of my invention I have herein shown a pedal which combines pedals of the rat-trap and rubber-bar type. I would have it understood, however, that I am not limited to combining the rat-trap and rubber-bar types of pedals or to the employment of the particular construction shown and described.

As shown in Figs. 1 to 6, inclusive, the frame of the pedal is articulated and comprises two flat wrought-metal frame-plates A and A', corresponding to each other, and arranged parallel with each other on the opposite sides of the spindle B of the pedal. The plate A is furnished with two parallel inwardly-projecting suspension-arms $A^2 A^3$, the inner ends of which are enlarged, and constructed with perforations $a\ a$ to adapt them to fit over and turn upon necks $c\ c'$, formed at the ends of a long cylindrical hub C, having a tapering long-threaded bore, and fitting over the spindle B, as shown. At its respective ends the said hub is formed with flanges C' C', against which the inner faces of the inner ends of the said arms bear. The frame-plate A' is provided with two corresponding parallel suspension-arms $A^4$ and $A^5$, which are enlarged at their inner ends, and constructed with perforations to adapt them to fit over and turn upon the necks $c\ c'$ aforesaid, the inner faces of their said ends bearing upon the outer faces of the inner ends of the said arms $A^2$ and $A^3$ of the said frame-plate A. The outer end of the neck $c$ is threaded for the attachment of the ball-case D, which coacts with a flange $b$, formed upon the spindle in confining a series of antifriction-balls E. The outer end of the neck $c'$ of the hub is threaded for the attachment of a ball-case D', which coacts with a grooved collar F in confining a series of antifriction-balls E, the said collar being internally threaded and removably and adjustably mounted upon the threaded stem B', formed at the termination of the outer end of the spindle and held in place by a non-rotatable washer G and a nut G', all as shown in Fig. 1.

The extreme inner ends of the arms $A^4$ and $A^5$ are formed with stop-notches $A^6\ A^6$, receiving stop-pins $A^7\ A^7$, mounted in the arms $A^2$ and $A^3$, the said pins playing back and forth in the said notches, and limiting the movement of the two frame-plates and their arms with respect to each other. The swinging of the plates A and A' within the limits of movement allowed by the notches $A^6\ A^6$ so shifts the center of gravity of the frame with respect to the spindle B that the frame automatically reverses itself, so as to present either one of its faces uppermost, according to the way in which the frame-plates are shifted, the frame being rebalanced, as it were, by the shifting of its center of gravity.

The corresponding edge of each of the frame-plates is serrated, as at H, so as to secure a rat-trap grip or hold upon the foot, the serrations being flanked at either end by horns H' H², preventing the foot from sliding laterally. The other edge of each plate is cut transversely to form a series of retaining-fingers I, which are alternately set in opposite directions, so as to form a skeleton pocket, as it were, for the reception of the rubber bars J, provided with long ribs J', which are forced into the said skeleton pockets, and there retained. At each end of the series of fingers are retaining-horns I' and I², having the same functions as the horns H' H² before mentioned. As herein shown, each of the frame-plates is constructed with narrow slots $a^2$ $a^2$ for the reception of tenons $a^3$, formed at the outer ends of the suspension-arms. The serrated edges H H of the respective plates together form what I may call the "rat-trap" foothold or working face of the frame, while the two rubber bars D D coact to form what I may term the "rubber-bar" foothold or working face of the frame.

When the frame-plates A and A' are adjusted, as shown in Fig. 3 of the drawings, the center of gravity of the frame is located below the spindle, and on the side of the rubber bars J J. The frame is now balanced so that the serrated edges of its frame-plates will be maintained uppermost, and the pedal will have all the functions of a rat-trap pedal pure and simple. On the other hand, if the plates are shifted oppositely, as shown in Fig. 4, the center of gravity will be shifted below the center of the spindle, and on the side of the serrated edges C C of the frame-plates, so that thereafter the pedal will be balanced with its rubber bars D D uppermost, and have all the functions of a rubber-bar pedal pure and simple.

The frame-plates may be shifted for converting the pedal either by hand or by the feet when the rider is propelling his machine, for it is apparent that by slipping his foot off from the uppermost face of the pedal and engaging it with the lower face thereof he can lift against the frame-plates, so as to turn them on the spindle, thus shifting the center of gravity of the pedal-frame and causing the same to be reversed in position, and balanced therein.

It is not necessary, however, that a pedal containing my invention be constructed as above described, for it may assume a variety of forms without departing from my invention. Thus in the construction shown by Fig. 7 the frame-plates K and K' are attached to the opposite ends of two supporting-arms L, only one of which is shown. Each of these arms is constructed with a central slot L', for the reception of the spindle M, with respect to which the pedal-frame may be shifted within the limit of movement represented by the length of the slot L', whereby the center of gravity of the frame is shifted from one side of the frame to the other. As shown in Fig. 7, the center of gravity is below the spindle on the side of the serrated edges N of the frame-plates, but in case the supporting-arms L are moved in the opposite direction within the limits set by the length of the slots L' the center of gravity of the frame will be shifted to the side of the plates carrying the bars O O, causing the frame to be reversed and balanced in a position in which the serrated edges will be uppermost. I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. A combination-pedal having its frame movable with respect to its spindle for shifting the center of gravity of the frame so as to balance the same with either of its faces or footholds uppermost, substantially as set forth.

2. A combination rat-trap and rubber-bar pedal having its frame movable with respect to its spindle for shifting the center of gravity of the frame so as to balance the same with either its rat-trap or rubber-bar faces or footholds uppermost, substantially as set forth.

3. A combination-pedal having an articulated frame, the members of which may be shifted in position with respect to the spindle of the pedal for shifting the center of gravity of the frame so as to balance the same with either of its faces or footholds uppermost, substantially as set forth.

4. A combination-pedal having a spindle, and a frame comprising two plates hung from the spindle and movable with respect thereto for changing their position and hence the center of gravity of the frame so as to cause the same to balance with either of its two faces or footholds uppermost, substantially as described.

5. In a combination-pedal, the combination with the spindle thereof, of two frame-plates each having two suspension-arms which are hung from the spindle, and which swing to permit the plates to be moved for shifting the center of gravity of the frame with respect thereto so as to cause the frame to be balanced with either of its two faces or footholds uppermost, substantially as described.

6. In a combination-pedal, the combination with the spindle thereof, of a hub mounted thereupon, two frame-plates located on opposite sides of the spindle, and two suspension-arms for each frame-plate, having their inner ends mounted upon the hub so as to turn thereupon, the respective edges of the said plates being adapted to form footholds or working faces which are presented to the foot according to the positions of the plates with respect to the spindle, substantially as described.

7. In a combination-pedal, the combination with the spindle thereof, of two frame-plates suspended therefrom, and movable with respect to each other to shift the center of gravity of the frame so as to cause the frame to balance with one of its faces or footholds uppermost, and means for limiting the relative movement of the two frame-plates, substantially as described.

8. In a bicycle-pedal the combination with a frame-plate having one of its edges transversely slit and the fingers thus formed struck in opposite directions to form an open case for the reception of a bar, substantially as set forth.

In testimony whereof I have signed this specification in the presence of two subscribing witnesses.

JOSEPH P. LAVIGNE.

Witnesses:
FRED. C. EARLE,
LILLIAN D. KELSEY.